United States Patent [19]

Neumann

[11] Patent Number: 5,094,321

[45] Date of Patent: Mar. 10, 1992

[54] SHOCK ABSORBER WITH VARIABLE DAMPING CHARACTERISTIC

[75] Inventor: Helmut Neumann, Glinde, Fed. Rep. of Germany

[73] Assignee: Körber AG, Hamburg, Fed. Rep. of Germany

[21] Appl. No.: 507,996

[22] Filed: Apr. 11, 1990

[30] Foreign Application Priority Data

Apr. 11, 1989 [DE] Fed. Rep. of Germany ....... 3911819

[51] Int. Cl.⁵ .............................................. F16F 9/50
[52] U.S. Cl. .................................. 188/285; 188/299
[58] Field of Search ................... 188/322.15, 299, 289, 188/322.22, 315, 285, 280, 281, 267; 280/707

[56] References Cited

U.S. PATENT DOCUMENTS

| | | | |
|---|---|---|---|
| 3,979,134 | 9/1976 | Keijzer et al. | 280/710 |
| 4,671,392 | 6/1987 | Wössner | 188/299 |
| 4,726,453 | 2/1988 | Obstfelder | 188/319 |
| 4,765,445 | 8/1988 | Komossa | 188/299 |
| 4,800,995 | 1/1989 | Berhhard et al. | 188/319 |
| 4,805,102 | 2/1989 | Ise et al. | 280/707 |
| 4,923,038 | 5/1990 | Lizell | 188/299 |
| 4,958,704 | 9/1990 | Leiber et al. | 188/285 |
| 4,974,707 | 12/1990 | Neumann et al. | 188/322.15 |

FOREIGN PATENT DOCUMENTS 3605182 8/1987 Fed. Rep. of Germany .

Primary Examiner—Robert J. Oberleitner
Assistant Examiner—Chris Schwartz
Attorney, Agent, or Firm—Peter K. Kontler

[57] ABSTRACT

A shock absorber wherein the piston of the piston-piston rod assembly divides the internal space of the cylinder into first and second chambers. The piston has first and second passages for the flow of fluid between the chambers in response to shifting the assembly relative to the cylinder and/or vice versa. One of these passages is controlled by a first check valve which prevents the flow of fluid through the one passage from the first chamber into the second chamber. A second check valve prevents the flow of fluid through the other passage from the second chamber into the first chamber. The piston-piston rod assembly further defines a plurality of bypasses each of which is controlled by a solenoid valve as well as by a pressure-responsive valve.

11 Claims, 2 Drawing Sheets

SHOCK ABSORBER WITH VARIABLE DAMPING CHARACTERISTIC

BACKGROUND OF THE INVENTION

The invention relates to shock absorbers in general, and more particularly to improvements in shock absorbers having a variable damping characteristic.

Commonly owned published German patent application No. 36 05 182 of Wessel discloses a shock absorber having a variable damping characteristic and being particularly suitable for use in motor vehicles. The shock absorber of Wessel comprises at least one fluid-containing cylinder or barrel for a piston which divides the internal space of the cylinder into two chambers and is connected with a piston rod which extends through and outwardly beyond one end wall of the cylinder. The piston-piston rod assembly of the shock absorber establishes one or more bypasses for the flow of fluid between the two chambers in response to penetration of a larger portion of the piston rod into or in response to extraction of a portion of the piston rod from the cylinder. The bypass or bypasses are controlled by solenoid valves.

Shock absorbers with bypasses for confined fluid are further disclosed in commonly owned U.S. Pat. No. 4,765,445 to Komossa et al. and in U.S. Pat. No. 4,726,453 to Obstfelder et al. Reference may also be had to commonly owned copending patent application Ser. No. 351,414 filed May 12, 1989 by Komossa and to commonly owned copending patent application Ser. No. 428,458 filed Oct. 30, 1989 by Neumann.

OBJECTS OF THE INVENTION

An object of the invention is to provide a shock absorber having a damping characteristic which is more satisfactory than those of available shock absorbers.

Another object of the invention is to provide the shock absorber with novel and improved means for controlling the flow of confined fluid between the chambers at the opposite sides of the piston in the cylinder or barrel of the shock absorber.

A further object of the invention is to provide a shock absorber which is more sensitive and more versatile than heretofore known shock absorbers.

An additional object of the invention is to provide the shock absorber with novel and improved means for regulating the flow of fluid along the bypass or bypasses in the piston-piston rod assembly.

Still another object of the invention is to provide a shock absorber which can be utilized in motor vehicles or elsewhere with greater advantage than heretofore known shock absorbers.

A further object of the invention is to improve shock absorbers of the type disclosed in published German patent application No. 36 05 182 of Wessel.

An additional object of the invention is to provide a shock absorber which constitutes an improvement over and a further development of shock absorbers of the type disclosed in commonly owned U.S. Pat. No. 4,765,445 to Komossa et al.

SUMMARY OF THE INVENTION

The invention is embodied in a shock absorber having a variable damping characteristic and being particularly suited for use in motor vehicles. The improved shock absorber comprises a fluid-containing cylinder or barrel having an internal space, a piston-piston rod assembly including a piston which is reciprocable in and divides the internal space of the cylinder into first and second chambers, and a piston rod which is connected with the piston and extends from the cylinder. The assembly and the cylinder are movable relative to each other in first and second directions to respectively move the piston rod into and out of the internal space of the cylinder, and the piston-piston rod assembly defines at least two bypasses between the first and second chambers. The shock absorber further comprises pressure-responsive valve, means provided in the assembly, one for each bypass, which regulate the flow independently of each other.

At least one of the valve means can comprise a spring-biased mobile valving element which is acted upon by fluid in the respective bypass to perform a first movement in response to relative movement of the cylinder and the piston-piston rod assembly in one of the first and second directions and to carry out a second movement in response to the relative movement of the cylinder and piston-piston rod assembly in the other of the first and second directions.

At least one of the valve means can comprise a reciprocable valving element, guide means for the valving element, and yieldable stops which flank the valving element. The arrangement may be such that the valving element surrounds the guide means, and each stop can comprise a spring-biased abutment for the valving element. The valving element is moved by the fluid in the respective bypass against one of the stops in response to relative movement of the piston-piston rod assembly and the cylinder in one of the first and second directions and the fluid moves the valving element in the respective bypass against the other of the stops in response to relative movement of the assembly and cylinder in the other of the first and second directions.

At least one of the valve means can include a first check valve which blocks the flow of fluid from the first into the second chamber and a second check valve which blocks the flow of fluid from the second into the first chamber. The check valves are preferably concentric and one of these check valves can surround the other check valve.

The valve means can be disposed in series, particularly within the confines of the piston rod.

Each of the valve means can comprise at least one pressure-responsive valving element which is movable to and from an open position in which such valving element establishes a path for the flow of fluid through the respective valving means. The arrangement is preferably such that one of these paths has a cross-sectional area which is greater than the cross-sectional area of another path. If the valve means include first and second valve means which are disposed in series, the cross-sectional area of the path which is defined by the at least one valving element of the second valve means is preferably greater than that of the path which is defined by the at least one valving element of the first valve means.

The novel features which are considered as characteristic of the invention are set forth in particular in the appended claims. The improved shock absorber itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
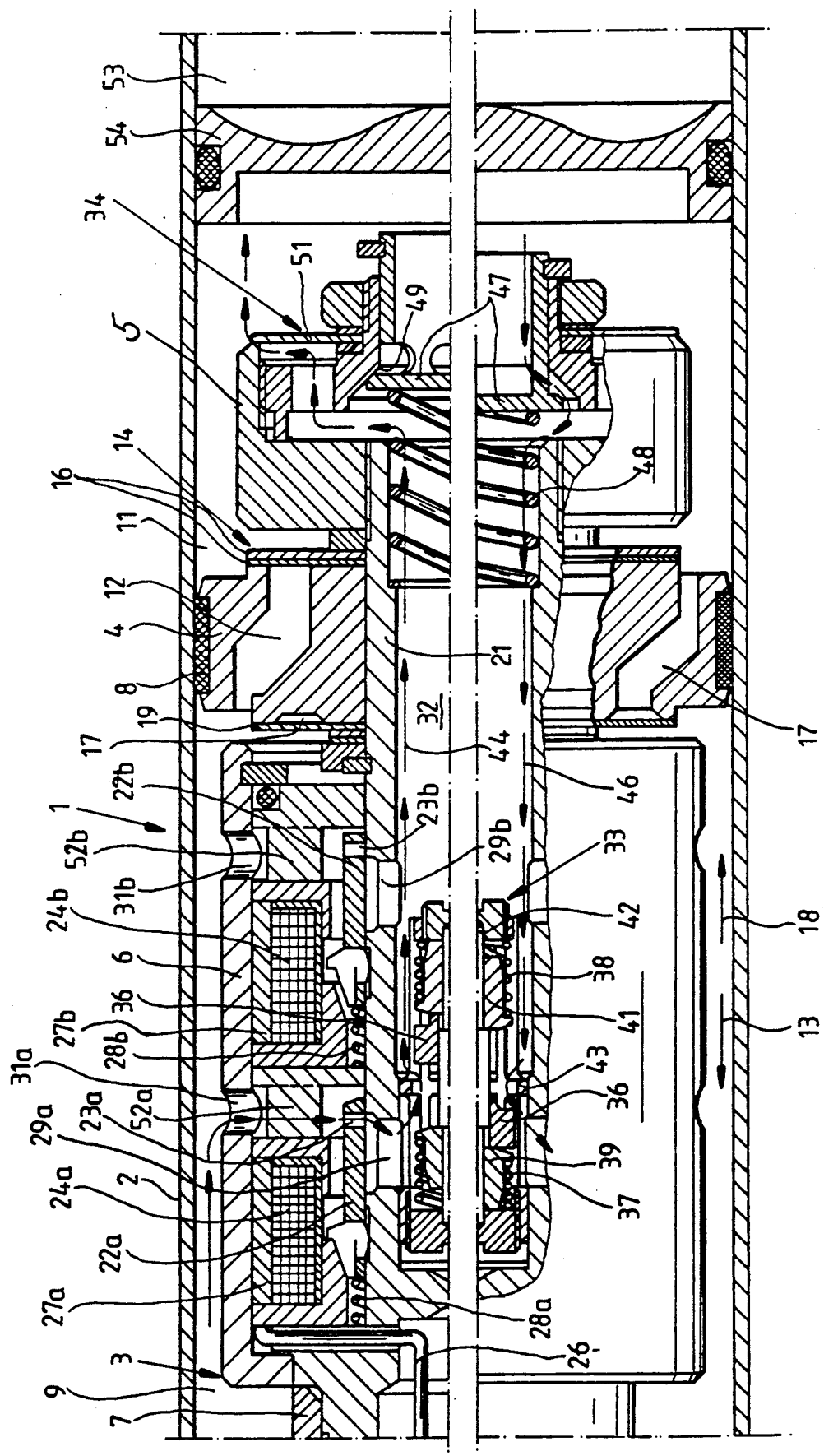
FIG. 1 is a fragmentary axial sectional view of a shock absorber which embodies one form of the invention, the positions of pressure responsive valve means in the upper half of the Figure being different from those which are shown in the lower half.

FIG. 1 shows a portion of a shock absorber 1 with a variable damping characteristic. The shock absorber comprises an elongated tubular barrel or cylinder 2 and a piston-piston rod assembly 3 having a piston 4 which is reciprocable in and divides the fluid-filled internal space of the cylinder 2 into a first chamber 9 and a second chamber 11. The piston rod 7 of the assembly 3 is connected to the piston 4 by a carrier 6 and extends through the left-hand end wall (not shown) of the cylinder 2. The peripheral surface of the piston 4 has a circumferential groove for an annular seal 8 which engages the internal surface of the cylinder 2 to prevent uncontrolled leakage of confined fluid (e.g., oil) between the chambers 9 and 11.

The piston 4 is formed with at least one first passage or channel 12 for the flow of fluid from the chamber 9 into the chamber 11 when the assembly 3 is moved relative to the cylinder 2 in the direction of arrow 13, i.e., in a direction to increase the volume of the chamber 11 while simultaneously reducing the volume of the chamber 9. The same result is achieved if the cylinder 2 is moved relative to the assembly 3 in the direction of arrow 18. At least one second passage 17 in the piston 4 enables the confined fluid to flow from the chamber 11 into the chamber 9 when the assembly 3 is moved in the direction of the arrow 18 (or when the cylinder 2 is moved in the direction of arrow 13).

A one-way or check valve 14 is provided to prevent the fluid from flowing through the passage or passages 12 when the piston rod 7 is caused to penetrate deeper into the cylinder 2 (i.e., during down stroke of the piston 4) as a result of movement of the assembly 3 in the direction of arrow 18 and/or as a result of movement of the cylinder 2 in the direction of the arrow 13. The check valve 14 comprises one or more resilient discs 16 which are clamped to the piston 4 and normally seal the respective end(s) of the passage(s) 12. A similar second one-way or check valve 19 (including one or more resilient discs) is provided to prevent the confined fluid from flowing through the passage or passages 17 in a direction from the chamber 9 into the chamber 11 when the assembly 3 moves in the direction of arrow 13 and/or when the cylinder 2 moves in the direction of arrow 18.

The assembly 3 further comprises a hollow cylindrical support 21 which extends through and beyond the carrier 6 and piston 4 and slidably supports the reciprocable ferromagnetic sleeve-like valving elements 22a, 22b of two solenoid valves in the carrier 6. The valving elements 22a, 22b (hereinafter called sleeves) are provided with annuli of preferably equidistant radially extending ports 23a, 23b which can be moved to and from register with, ports 29a, 29b in the support 21. The sleeves 22a, 22b are respectively surrounded by the exciting coils 24a, 24b of the respective solenoid valves, and such coils are connectable with an energy source (not shown) by conductor means 26. The coils 24a, 24b are respectively surrounded by ferromagnetic rings 27a, 27b of the respective solenoid valves.

When the coil 24a or 24b is excited, the corresponding sleeve 22a or 22b is caused to move along the support 21 against the opposition of the respective valve spring 28a, 28b to move its ports 23a or 23b into register with the corresponding ports 29a or 29b of the support 21. This opens a portion of the corresponding bypass which is provided in the assembly 3 to enable the fluid to flow between the chambers 9, 11 in addition to that fluid which then flows through the passage(s) 12 or 17 (depending upon the direction of relative movement of the assembly 3 and cylinder 2). The springs 28a, 28b tend to maintain the associated sleeves 22a, 22b in those axial positions in which the ports 23a, 23b are respectively sealed from the ports 29a, 29b.

FIG. 1 shows the sleeve 22b of the right-hand solenoid valve in closed or sealing position. The sleeve 22a of the left-hand solenoid valve is shown in open position. Thus, if the piston rod 7 is pulled out of the cylinder 2 (in the direction of arrow 13) while the coil 24a of the left-hand solenoid valve is energized, fluid can flow from the chamber 9 toward the chamber 11 by way of the passage(s) 12 (because the fluid opens the check valve 14) and the left-hand solenoid valve permits fluid to flow from the chamber 9, through one or more radial bores 31a in the outer cylindrical wall of the carrier 6, through one or more radial channels 52a between the coils 24a, 24b, through the ports 23a and the then registering ports 29a, and into the axial channel 32 of the hollow support 21.

If the coil 24b is energized in addition to or in lieu of the coil 24a, fluid can flow from the chamber 9 into the channel 32 by way of one or more radial bores 31b in the outer wall of the carrier 6, one or more radial channels 52b to the right of the coil 24b, through the ports 23b of the sleeve 22b and through the ports 29b of the support 21 (the ports 29b then register with the ports 23b).

In accordance with a feature of the invention, the improved shock absorber further comprises two pressure-responsive valve means 33 and 34 which are disposed in series, one in the support 21 and the other in a head 5 to the right of the piston 4. The valve means 33 controls the bypass which is also controlled by the left-hand solenoid valve including the coil 24a, and the valve means 34 controls the bypass which is controlled by the right-hand solenoid valve including the coil 24b.

The pressure-responsive valve means 33 comprises a single valving element 36 which is or includes a ring surrounding an elongated guide 42 in the support 21, and two spring-biased stops which flank the valving element 36 (as seen in the axial direction of the support 21). The left-hand stop includes an abutment 39 which is slidable along and surrounds the guide 42 and is biased toward the valving element 36 by a coil spring 37. The right-hand stop includes an abutment 41 which is slidable along and surrounds the guide 42 and is biased toward the valving element 36 by a coil spring 38. The fluid in the bypass which is defined by the assembly 3 and is controlled by the valve means 33 can displace the valving element 36 against the opposition of the spring 37 or 38, depending upon the direction of movement of the assembly 3 and cylinder 2 with reference to one another.

When the coil 24a is energized to maintain the sleeve 22a of the left-hand solenoid valve in open position, fluid in the corresponding bypass of the assembly 3 acts upon the valving element 36 of the pressure-responsive valve means 33 to move the valving element 36 against the abutment 41 when the assembly 3 is moved in the direction of arrow 13, or to move the valving element 36 against the abutment 39 if the assembly 3 is moved in the direction of arrow 18. The valving element 36 need not yield in immediate response to opening of the left-hand solenoid valve and a movement of the assembly 3 in the direction of arrow 13 or 18. Thus, the arrangement may be such that, when the sleeve 22a maintains its ports 23a in register with the ports 29a of the support 21 and the assembly 3 is moved in the direction of arrow 13, the spring 38 initially opposes any rightward axial movement of the abutment 41 under the action of the valving element 36 which tends to move in the direction of arrow 18. The valving element 36 moves to the right (to the position which is shown in the upper half of FIG. 1) when the pressure of fluid in the respective bypass increases sufficiently to cause the spring 38 to store energy and to permit the abutment 41 to move away from the abutment 39. This moves the valving element 36 away from a fixed annular seat 43 of the valve means 33 so that the fluid is free to flow from the ports 29a of the support 21 into the channel 32 and on toward the valve means 34 for admission into the chamber 11. The flow of fluid from the chamber 9 into the chamber 11 through the bypass which is controlled by the left-hand solenoid valve and by the pressure-responsive valve means 33 is indicated by the chain of arrows 44. The flow of fluid in the direction of arrows 44 takes place when the piston rod 7 is pulled in the direction of arrow 13 and/or when the cylinder 2 is pulled in the direction of arrow 18.

When the piston rod 7 is pushed deeper into the cylinder 2 (arrow 18) and/or when the cylinder 2 is pushed in the direction of the arrow 13 (while the left-hand coil 24a is energized to maintain the ports 23a of the sleeve 22a in register with the ports 29a of the support 21), fluid which fills the ports 29a acts upon the valving element 36 of the valve means 33 in the direction of arrow 13 so that the valving element 36 acts upon the abutment 39 which can yield against the opposition of the respective spring 37 to enable the valving element 36 to move to the left of the stationary seat 43 whereby the fluid can flow from the chamber 11 into the chamber 9 along the bypass which is indicated by the chain of arrows 46 in the lower half of FIG. 1.

The second pressure-responsive valve means 34 comprises two concentric one-way or check valves including a first check valve having a valving element 47 and a second check valve having a valving element 51 which surrounds the valving element 47. The valving element 47 is biased against its seat 49 by a coil spring 48 which reacts against an internal shoulder of the support 21, and the valving element 51 comprises one or more discs which are clamped against the head 5 and can yield when the fluid flows in the direction of arrows 44. The spring 48 yields when the fluid flows in the direction of arrows 46. The outer check valve (including the valving element 51) of the pressure-responsive valve means 34 is analogous to the check valve 14 or 19.

The shock absorber can be made softer by energizing the coil 24b simultaneously with the coil 24a. This ensures that hydraulic fluid can flow between the chambers 9 and 11 along two bypasses one of which includes the radial bores 31a and channels 52a, and the other of which includes the radial bores 31b and the radial channels 52b. At such time (and assuming that the assembly 3 is pulled in the direction of arrow 13), a relatively large quantity of fluid can flow from the chamber 9 into the channel 32 to act upon and to deform the valving element 51 of the valve means 34 in order to enter the chamber 11. Inversely, a relatively large quantity of fluid can flow from the chamber 11, around the lifted check valve 47, into the channel 32 and thence into the chamber 9 (by way of the bores 31a and 31b) when the assembly 3 is pushed in the direction of arrow 18. The lifted position of the check valve 47 (i.e., away from the seat 49) is shown in the lower half of FIG. 1.

An advantage of the pressure-responsive valve means 33 and 34 is that they can at least slightly increase the damping force, especially when the speed of movement of the assembly 3 and cylinder 2 relative to each other is rather low.

The shock absorber 1 is preferably designed in such a way that the cross-sectional area of the path which is defined by one of the bypasses is preferably different than the cross-sectional area of the path which is defined by the other bypass. In FIG. 1, the cross-sectional area of the path which is defined by the first of the two bypasses (namely the bypass which is controlled by the valve means 33) is smaller than the cross-sectional area of the path which is defined by the other bypass. This can be readily achieved by making the combined cross-sectional area of the ports 23b larger than the combined cross-sectional area of the ports 23a. Such design of the shock absorber ensures that its characteristic can be varied within a wider range, namely in response to energization of the coil 24a, in response to energization of the coil 24b or in response to simultaneous energization of both coils. The shock absorber is relatively "hard" when the two coils 24a, 24b are deenergized so that the confined fluid can flow between the chambers 9 and 11 exclusively by way of the passage(s) 12 or 17. The shock absorber is softer when the coil 24a and/or the coil 24b is energized. The degree of softness depends upon the number of energized coils as well as upon the selected energized coil.

The radial channels 52a, 52b are defined by inserts which are provided in the carrier 6 of the piston-piston rod assembly 3. These inserts establish paths between the bores or holes 31a, 31b and the respective annuli of ports 23a, 23b.

The springs 28a, 28b invariably maintain the respective sleeves 22a, 22b in sealing positions when the respective coils 24a, 24b are deenergized. FIG. 1 shows the sleeve 22a in open position and the sleeve 22b in closed or sealing position.

The cylinder 2 further contains a reciprocable partition 54 which is located to the right of the head 5 and seals the chamber 11 from a chamber 53 containing a body of compressed gaseous fluid. The gas in the chamber 53 expands when the assembly 3 is pulled to the left (arrow 13) so that the partition 54 moves to the left in order to compensate for the volume of extracted portion of the piston rod 7. The partition 54 is moved in the opposite direction (arrow 18) when the piston rod 7 is caused to penetrate deeper into the chamber 9. Thus, the gas in the chamber 53 cooperates with the partition 54 to ensure that the chambers 9 and 11 are invariably filled with fluid.

Figure 2:
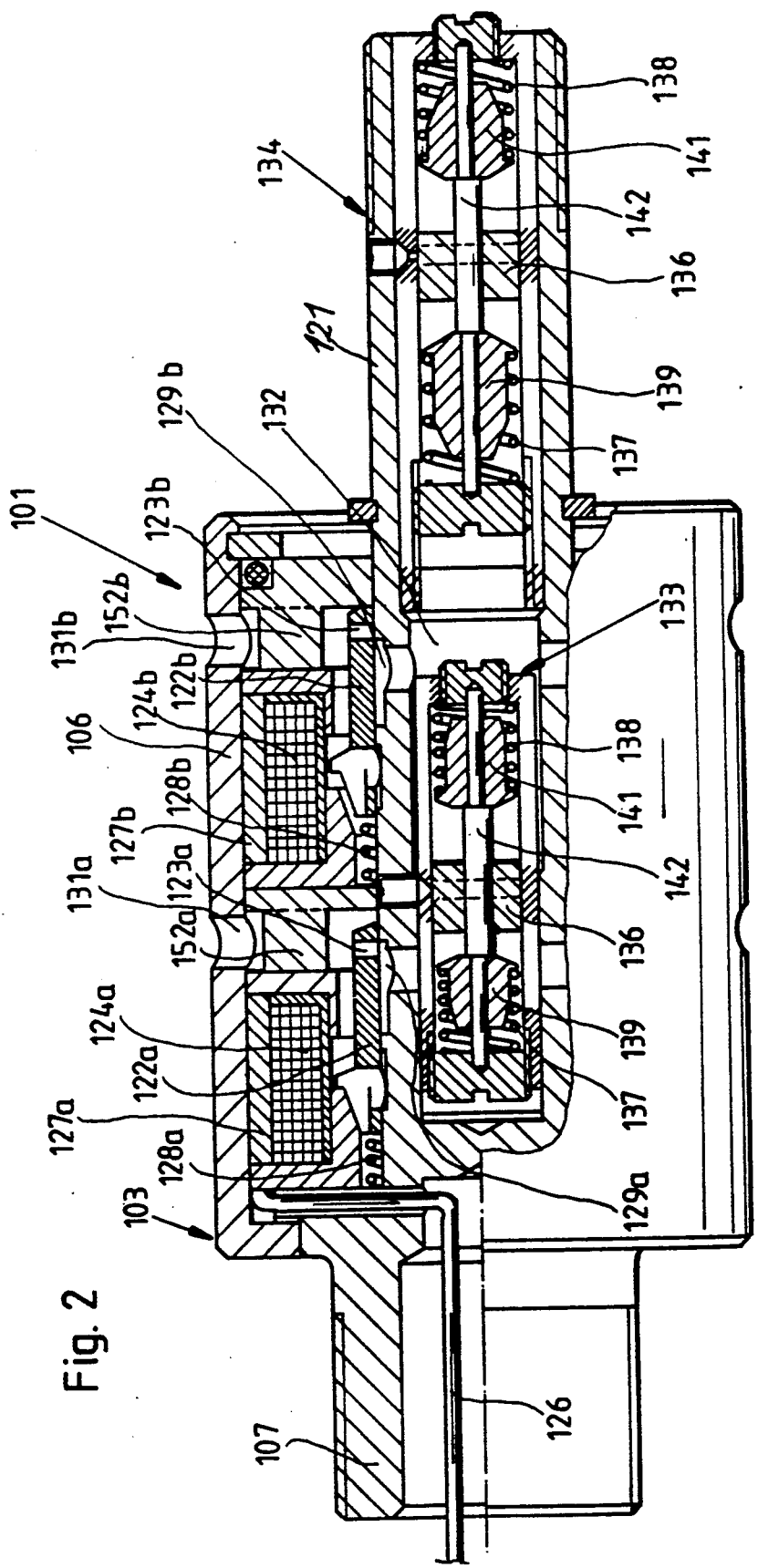
FIG. 2 is a fragmentary axial sectional view of a modified shock absorber.

FIG. 2 shows a portion of a modified shock absorber 101. All such parts of this shock absorber which are identical with or clearly analogous to corresponding parts of the shock absorber 1 of FIG. 1 are denoted by similar reference characters plus 100. The main difference between the two shock absorbers is that the pressure-responsive valve means 134 of the shock absorber 101 is identical with the pressure-responsive valve means 133. The valve means 133, 134 are installed in series in the axial channel 132 of the support 121. The cross-sectional area of the path which is defined by the bypass containing the valve means 134 is different from the cross-sectional area of the path which is defined by the bypass controlled by the valve means 133.

An important advantage of the improved shock absorber is that the differences in damping characteristic are more readily felt when the one and/or the other solenoid valve is open, i.e., when the one and/or the other bypass is effective to permit the fluid to flow between the chambers 9, 11 or between the corresponding chambers of the shock absorber 101. Moreover, the damping action is more pronounced when the speed of movement of the cylinder and piston-piston rod assembly 3 or 103 relative to each other is rather low.

The number of bypasses and of the pressure-responsive valve means can be increased to three or more without departing from the spirit of the invention.

Though it is possible to provide each pressure-responsive valve means with a pair of valving elements one of which opens a path for the flow of fluid along the respective bypass in response to extraction of the piston rod from the cylinder whereas the other opens a path in response to penetration of the piston rod deeper into the cylinder, designs of the type shown at 33, 133 and 134 are preferred at this time because they contribute to compactness, simplicity and lower cost of the pressure-responsive valve means. Moreover, the reaction of a single valving element is more predictable than those of two discrete valving elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A shock absorber having a variable damping characteristic, particularly for use in motor vehicles, comprising a fluid-containing cylinder having an internal space; a piston-piston rod assembly including a piston reciprocable in said cylinder and dividing said space into first and second chambers, and a piston rod connected with said piston and extending from said cylinder, said assembly and said cylinder being movable relative to each other in first and second directions to respectively move said piston rod into and out of said space, said assembly defining first and second passages for the flow of fluid between said chambers and at least two bypasses between said chambers said bypasses defining first paths for the flow of fluid between said chambers and said first and second passages defining discrete second paths for the flow of fluid between said chambers; first check valve means for preventing the flow of fluid from said first chamber into said second chamber by way of said first passage; second check valve means for preventing the flow of fluid from said second chamber into said first chamber by way of said second passage; and discrete pressure-responsive valve means provided in said assembly, one for each of said bypasses, to regulate the flow of fluid in the respective bypasses independently of each other bypass.

2. The shock absorber of claim 1, wherein at least one of said pressure-responsive valve means comprises a spring-biased mobile valving element which is acted upon by fluid in the respective bypass to perform a first movement in response to relative movement of said assembly and said cylinder in one of said first and second directions and to carry out a second movement in response to said relative movement in the other of said first and second directions.

3. The shock absorber of claim 1, wherein at least one of said pressure-responsive valve means comprises a reciprocable valving element, guide means for said valving element, and yieldable stops, said valving element being located between said stops.

4. The shock absorber of claim 1, wherein at least one of said pressure-responsive valve means includes a first check valve which blocks the flow of fluid from said first into said second chamber and a second check valve which blocks the flow of fluid from said second into said first chamber.

5. The shock absorber of claim 4, wherein said check valves are concentric and one of said check valves surrounds the other of said check valves.

6. The shock absorber of claim 1, wherein said pressure-responsive valve means are disposed in series.

7. The shock absorber of claim 1, wherein said pressure-responsive valve means are disposed in series within said piston rod.

8. The shock absorber of claim 1, wherein each of said pressure-responsive valve means includes at least one pressure-responsive valving element movable to and from an open position in which it establishes a discrete path for the flow of fluid through the respective pressure-responsive valve means, one of said paths having a cross-sectional area greater than that of another of said paths.

9. The shock absorber of claim 8, wherein said pressure-responsive valve means include first pressure-responsive valve means and second pressure-responsive valve means in series with said first pressure-responsive valve means, the cross-sectional area of the path which is defined by the at least one valving element of said second pressure-responsive valve means being greater than that of the path which is defined by the at least one valving element of said first pressure-responsive valve means.

10. The shock absorber of claim 1, wherein at least one of said passages is provided in said piston.

11. A shock absorber having a variable damping characteristic, particularly for use in motor vehicles, comprising a fluid-containing cylinder having an internal space; a piston-piston rod assembly including a piston reciprocable in said cylinder and dividing said space into first and second chambers, and a piston rod connected with said piston and extending from said cylinder, said assembly and said cylinder being movable relative to each other in first and second directions to respectively move said piston rod into and out of said space, said assembly definnig at least two bypasses between said chambers; and discrete pressure-responsive valve means provided in said assembly, one for each of said bypasses, to regulate the flow of fluid in the respective bypasses independently of each other bypass, at least one of said valve means comprising a reciprocable valving element, guide means for said valving element, and yieldable stops, said valving element being located between said stops and surrounding said guide means, each of said stops comprising a spring-biased abutment for said valving element and said valving element being moved by the fluid in the respective bypass against one of said stops in response to relative movement of said assembly and said cylinder in one of said directions, said valving element being moved by the fluid in the respective bypass against the other of said stops in response to said relative movement in the other of said directions.

* * * * *